(12) United States Patent
Babu et al.

(10) Patent No.: US 9,063,737 B2
(45) Date of Patent: Jun. 23, 2015

(54) WIRELESS CARD READER WITH ONE OR MORE CARD INTERFACES

(75) Inventors: Amish Babu, Mountain View, CA (US); Jesse Dorogusker, Palo Alto, CA (US); Kartik Lamba, San Francisco, CA (US); Elliot Sather, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 132 days.

(21) Appl. No.: 13/603,941

(22) Filed: Sep. 5, 2012

(65) Prior Publication Data

US 2014/0001263 A1    Jan. 2, 2014

Related U.S. Application Data

(60) Provisional application No. 61/667,353, filed on Jul. 2, 2012.

(51) Int. Cl.
| | |
|---|---|
| *G06K 7/00* | (2006.01) |
| *G06F 1/32* | (2006.01) |
| *G07F 7/08* | (2006.01) |
| *G06K 7/08* | (2006.01) |
| *H04W 52/02* | (2009.01) |

(52) U.S. Cl.
CPC ............ *G06F 1/3287* (2013.01); *G06F 1/3215* (2013.01); *G06K 7/0004* (2013.01); *G07F 7/0886* (2013.01); *H04W 52/0254* (2013.01); *G06K 7/0013* (2013.01); *G06K 7/084* (2013.01); *Y02B 60/1282* (2013.01)

(58) Field of Classification Search
USPC ....................................................... 235/440
See application file for complete search history.

(56) References Cited

U.S. PATENT DOCUMENTS

| | | | | |
|---|---|---|---|---|
| 5,434,395 | A * | 7/1995 | Storck et al. ................. | 235/380 |
| 2006/0142058 | A1 * | 6/2006 | Elias et al. ................. | 455/556.1 |
| 2006/0219776 | A1 * | 10/2006 | Finn .............................. | 235/380 |
| 2010/0308976 | A1 * | 12/2010 | Seban et al. ................ | 340/10.5 |
| 2011/0070834 | A1 * | 3/2011 | Griffin et al. ............... | 455/41.1 |
| 2012/0126011 | A1 |  5/2012 | Lamba et al. | |

FOREIGN PATENT DOCUMENTS

WO    WO2012/003892    1/2012

OTHER PUBLICATIONS

International Search Report and Written Opinion dated Oct. 16, 2013 for International Patent Application No. PCT/US2013/049162, filed Jul. 2, 2013. 13 pages.

* cited by examiner

*Primary Examiner* — Michael G Lee
*Assistant Examiner* — David Tardif
(74) *Attorney, Agent, or Firm* — Novak Druce Connolly Bove + Quigg LLP

(57) ABSTRACT

Methods, systems, and apparatus, for a payment card reader comprising: a frame, where the frame includes a top surface, a bottom surface, a first side surface, and a second side surface, a second side surface of the side surfaces on an opposite side of the frame from the first side surface, the first side surface including a groove configured to receive a swipe of a magnetic stripe card, the second side surface including a slot configured to receive insertion of a chip card; a magnetic stripe reader interface; a chip card reader interface; circuitry configured to direct signals from the magnetic stripe reader interface and the chip card reader interface to a microcontroller in the card reader; and circuitry configured to communicate wirelessly between the card reader and a computing device.

18 Claims, 7 Drawing Sheets

WIRELESS CARD READER WITH ONE OR MORE CARD INTERFACES

RELATED APPLICATIONS

This application claims under 35 U.S.C. §119(e) the benefit of U.S. Provisional Application No. 61/667,353, filed Jul. 2, 2012, which is hereby incorporated by reference in its entirety.

TECHNICAL FIELD

This disclosure relates to a mobile card reader.

BACKGROUND

Generally, a merchant uses a terminal to process a transaction. The terminal is connected, usually with wires, to a cash register and to an Internet connection. Some terminals process chip cards; for such terminals a card is inserted into the terminal and the user enters a Personal Identification Number (PIN) on a keypad of the terminal. Other terminals process magnetic stripe cards; for such terminals the card is swiped through a slot.

Mobile card readers are available for magnetic stripe cards. Some mobile card readers use WiFi technology to communicate with the credit card processor via a wireless network access point. Some mobile card readers, e.g., in taxies, use cellular technology to communicate wirelessly with the credit card processor.

In a conventional point of sale electronic credit card present transaction, the transaction is authorized and captured. In the authorization stage, a physical credit card with a magnetic stripe is swiped through a merchant's magnetic card reader, e.g., as part of a point of sale device. A payment request is sent electronically from the magnetic card reader to a credit card processor. The credit card processor routes the payment request to a card network, e.g., Visa or Mastercard, which in turn routes the payment request to the card issuer, e.g., a bank. Assuming the card issuer approves the transaction, the approval is then routed back to the merchant. In the capture stage, the approved transaction is again routed from the merchant to the credit card processor, card network and card issuer, and the payment request can include the cardholder's signature (if appropriate). The capture state can trigger the financial transaction between the card issuer and the merchant, and optionally creates a receipt. There can also be other entities, e.g., the card acquirer, in the route of the transaction. Debit card transactions have a different routing, but also require swiping of the card.

SUMMARY

Existing card readers are generally bulky and expensive. Some more recent card readers are smaller but must be physically connected to a mobile computing device, e.g., by plugging the card reader into an audio or USB port. In either case, the keypad and/or display requires a wired connection to the card reader. However, a wireless card reader configured to read a card can communicate wirelessly to a computing device, e.g., a smart phone, tablet computer, or the like. When the card reader is connected wirelessly to the computing device, an application installed on the mobile computing device permits the computing device to communicate with the card reader and a card processor in order to process transactions. The application can generate a user interface on a display of the computing device for entry of a signature, PIN, or the like. In some implementations, the card reader includes an element that a user can use for signature, PIN (e.g., hardware pin entry), or the like.

The wireless card reader can be power efficient by powering its internal components as needed. Internal components can include a chip card reader interface, a magnetic stripe reader interface, a power source, a microcontroller, a wake up circuit, and an antenna. The microcontroller can control power sequences in the card reader, thereby maximizing its battery life.

In one aspect, a payment card reader includes a microcontroller; one or more card interfaces, where each of the one or more card interfaces is configured to communicate with the microcontroller; an antenna, where the antenna is configured to communicate with the microcontroller and, wirelessly, with a computing device; a wake-up circuit, where the wake-up circuit is configured to activate the microcontroller upon a card interaction at a corresponding card interface, where upon the card interaction, the microcontroller receives card data from the corresponding card interface, processes and encrypts the data, and sends the card data to the antenna, and where the antenna sends and receives data wirelessly to and from the computing device, respectively, where the data includes the card data; and a power source, where the power source powers one or more of the following: the microcontroller, the one or more card reader interfaces, the antenna, and the wake-up circuit.

Implementation may include one or more of the following. The power source includes a lithium ion battery. The power source includes a rechargeable battery, where the rechargeable battery is recharged using an external adapter or a Universal Serial Bus (USB). The one or more card interfaces include one or more of the following: a magnetic stripe reader interface, a chip card reader interface, and/or a contactless card reader interface (e.g., NFC reader). The magnetic stripe reader interface is coupled to an accelerometer, where the accelerometer is used as a wake-up circuit. The microcontroller is configured to activate only one of the chip card reader interface or the magnetic stripe reader interface. The magnetic stripe reader interface and the chip card reader interface are integrated as a combined device. The chip card reader interface implements the Europay, Mastercard, Visa (EMV) protocol. The antenna is a Bluetooth adapter and is an element that communicates using a Bluetooth protocol. The antenna is a WiFi adapter and is an element that communicates through a WiFi network. The power source includes a direct current convertor, where the direct current convertor converts current from the power source to usable power for the microcontroller, and where the microcontroller is powered by the usable power. The microcontroller is configured to power the antenna only after receipt of card data from the one or more interfaces. The card interaction is a card swipe or a card insertion.

In another aspect, a method for conserving power in a system includes receiving a card interaction from a card at a card interface of the system, where the system comprises components including one or more of the following: a microcontroller, one or more card interfaces, a power source, an antenna, and a wake-up circuit, where the components are powered down, and where the card interaction triggers the wake-up circuit; activating a power source using a signal from the wake-up circuit; powering the microcontroller using the power source; in response to powering the microcontroller: powering down the wake-up circuit; powering up, using the power source, the card and the respective card interface associated with the card interaction; receiving card data from the card through the card interface; powering down the card and the respective card interface; powering up the antenna; and sending the card data, to a computing device, using the antenna.

Implementation may include one or more of the following. The one or more card interfaces includes one or more of the following: a magnetic card stripe reader interface or a chip card reader interface. The chip card reader interface implements the Europay, Mastercard, Visa (EMV) protocol. The card interaction is one of the following: a card swipe or a card insertion. In response to sending the card data, further comprising: receiving, from the computing device, response data; powering up the card and the respective card interface; sending the response data to the card through the respective card interface. In response to sending the response data, further comprising: receiving authentication data from the card through the respective card interface; sending the authentication data to the computing device using the antenna; and powering down the antenna. The card data includes a signature, an authentication notification for a transaction, a card number, an expiry date, or a name. The response data includes a passcode inputted by a user or transaction data. The antenna is a Bluetooth adapter and communicates using a Bluetooth protocol. The antenna is a WiFi adapter and communicates through a WiFi network. The power source includes a lithium ion battery. The power source includes a rechargeable battery, where the rechargeable battery is recharged using an external adapter or a Universal Serial Bus (USB). The power source includes a direct current convertor, where the direct current convertor converts current from the power source to usable power for the microcontroller, and where the microcontroller is powered by the usable power.

In another aspect, a card reader that communicates wirelessly includes a frame, where the frame includes a top surface, side surfaces, and a bottom surface, one or more of the side surfaces including one or more openings to receive cards through, respectively, one or more card interfaces; circuitry configured to direct signals from the one or more card interfaces to a microcontroller in the card reader; and circuitry configured to communicate wirelessly between the card reader and a computing device. In some examples, the card reader does not include any of the following: external wiring, a keypad, or a display. In other examples, the card reader can include a pin entry keypad or display.

Implementation may include one or more of the following. The one or more card interfaces include one or more of the following: a magnetic stripe reader interface or a chip card reader interface. The one or more openings include grooves and a slot for a smart chip card and a magnetic stripe card, respectively. Circuitry configured to efficiently power the card reader. The frame is rectangular.

In another aspect, a card reader that communicates wirelessly includes a frame, where the frame includes a top surface, a bottom surface, a first side surface, and a second side surface, a second side surface of the side surfaces on an opposite side of the frame from the first side surface, the first side surface including a groove configured to receive a swipe of a magnetic stripe card, the second side surface including a slot configured to receive insertion of a chip card; a magnetic stripe reader interface including magnetic read heads positioned in the frame to read a stripe of the magnetic stripe card as it is swiped through the groove; a chip card reader interface including electrical contacts positioned in the frame to contact contacts of the chip card when it is inserted into the slot; circuitry configured to direct signals magnetic stripe reader interface and the chip card reader interface to a microcontroller in the card reader; and circuitry configured to communicate wirelessly between the card reader and a computing device.

Implementations may include one or more of the following. A wake-up circuit, where the wake-up circuit is configured to activate the microcontroller upon a card interaction at a corresponding card interface, where upon the card interaction, the microcontroller receives card data from the corresponding card interface and sends the card data to the circuitry configured to communicate wirelessly, and where the circuitry configured to communicate wirelessly sends and receives data to and from the computing device, respectively, where the data includes the card data. The magnetic stripe reader interface is coupled to an accelerometer, where the accelerometer triggers or functions as the wake-up circuit. The microcontroller is configured to activate only one of the chip card reader interface or the magnetic stripe reader interface. The card interaction is a card swipe or a card insertion. A power source, where the power source powers one or more of the following: the magnetic stripe reader interface, the chip card reader interface, the circuitry configured to direct signals, and the circuitry configured to communicate wirelessly. The power source includes a rechargeable battery, where the rechargeable battery is recharged using an external adapter or a Universal Serial Bus (USB). The microcontroller is configured to power the circuitry configured to communicate wirelessly only after receipt of card data from the magnetic stripe reader interface or the chip card reader interface. The magnetic stripe reader interface and the chip card reader interface are integrated as a combined device. The chip card reader interface implements the Europay, Mastercard, Visa (EMV) protocol.

Advantages may include one or more of the following. A computing device can communicate with a card reader wirelessly, allowing a user, e.g., a merchant or a customer, to interface with the card reader without interference from a wire. A merchant can use the wireless card reader to improve a buying experience for a customer. For example, the merchant can allow the customer to swipe the customer's own card at the card reader while the merchant finalizes transaction details on the computing device. The card reader can run power efficiently to maximize battery life. The card reader can also be turned on through a card interaction and does not require a power switch, e.g., an on/off button, for operation.

BRIEF DESCRIPTION OF THE DRAWINGS

Like reference numbers and designations in the various drawings indicate like elements.

DETAILED DESCRIPTION

Figure 1:
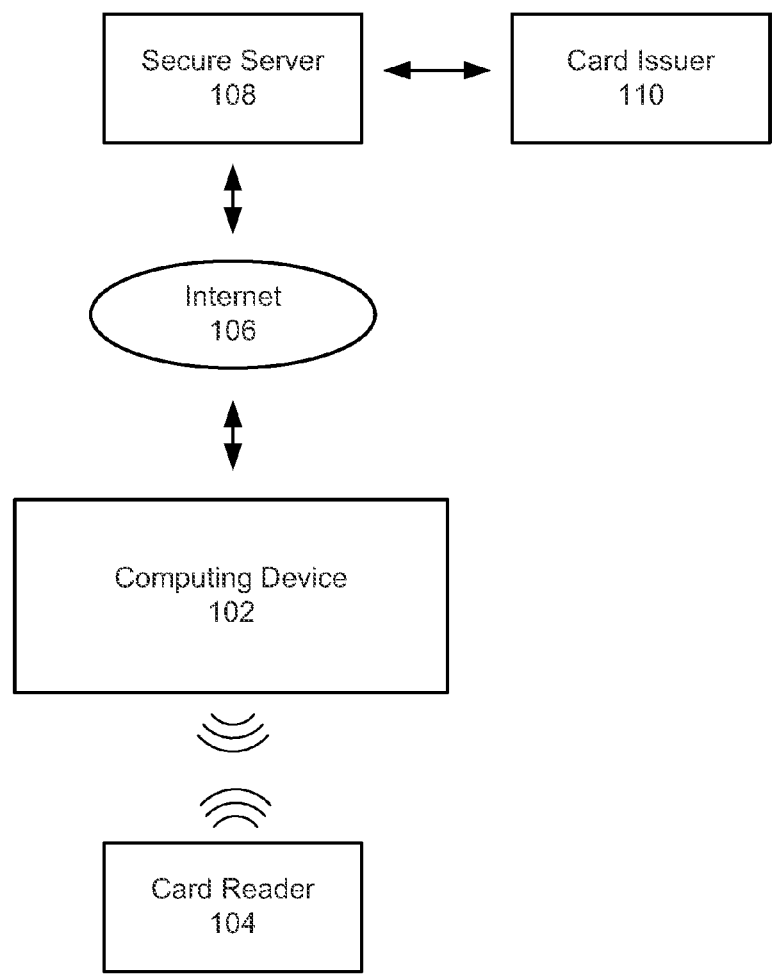
FIG. 1 is a schematic illustration of an example system for conducting a transaction using a wireless card reader.

FIG. 1 is a schematic illustration of an example system 100 for conducting a transaction using a wireless card reader. A transaction can include reading cards such as payment cards (e.g., credit cards), drivers license cards, identification cards, etc. The system 100 is capable of processing a payment transaction between a mobile computing device 102 and a wireless card reader 104.

The computing device 102 can be a mobile device or a desktop device. Mobile devices include smart phones, tablet computers, laptops, or other mobile data processing apparatus. The computing device 102 can be other readers, e.g., card readers, or existing point of sale systems.

The wireless card reader 104 can process magnetic stripe cards or smart chip cards. Smart chip cards can be processed according to the Europay, Mastercard, Visa (EMV) protocol. In some implementations, the wireless card reader 104 processes cards using Near Field Communication (NFC) hardware and the NFC protocol. The wireless card reader 104 is built only with one or more mechanisms to receive cards and to communicate wirelessly with the computing device 102. Thus, the wireless card reader can be smaller, lighter and simpler than card readers with integrated keypads or displays. The wireless card reader 104 need not include a keypad, a display, an interface for receiving signatures, e.g., a touch screen display, or a cellular connection to a payment processing system on an external network, e.g., the Internet.

The computing device 102 can communicate with the wireless card reader 104 wirelessly. Wireless communication can be over a wireless local area network or shorter range wireless network, and can occur in many forms, e.g., Bluetooth, WiFi, or NFC. In some implementations, a Bluetooth Low Energy protocol is used. The wireless card reader 104 can broadcast data to the computing device 102 and vice-versa. In alternative implementations, the wireless card reader 104 and the computing device 102 undergo a pairing process before establishing communication to verify a source and destination for data transfer.

For a payment transaction using a magnetic stripe card, a card can be swiped at the wireless card reader 104. The wireless card reader 104 sends card data of the magnetic stripe card to the computing device 102 using an antenna. The computing device 102 can be waiting to receive card data from the wireless card reader 104, e.g., by scanning for Bluetooth data broadcasts. The remainder of the transaction can occur between the computing device 102 and other card processing systems.

For a payment transaction using a smart chip card, a card can be inserted into the card reader 104 so that the reader engages electrical contacts for a microchip on the card. The card reader 104 sends a PIN request to the computing device 102 using the antenna. The computing device 102 receives a PIN from the user, e.g., entered through a user interface on or connected to the computing device, and sends the PIN to the card reader 104 for confirmation, e.g., wirelessly. The card reader 104 sends the PIN to the card, which contains a chip with an embedded PIN. The card compares the received PIN to the embedded PIN. If the PINs match, the card sends a confirmation to the card reader 104, which sends the confirmation to the computing device 102 wirelessly.

After receiving data, e.g., card data or a confirmation, from either the magnetic stripe card or the smart chip card, the computing device 102 can transmit an authorization for transaction to a secure server 108 for payment processing, e.g. by using an external network such as the Internet 106. The secure server 108 can relay the transaction to the card issuer 104, which ultimately approves or denies the transaction. The card issuer 104 can communicate the approval or denial to the secure server 108, which can relay the card issuer's approval or denial to the computing device 102.

Figure 2:
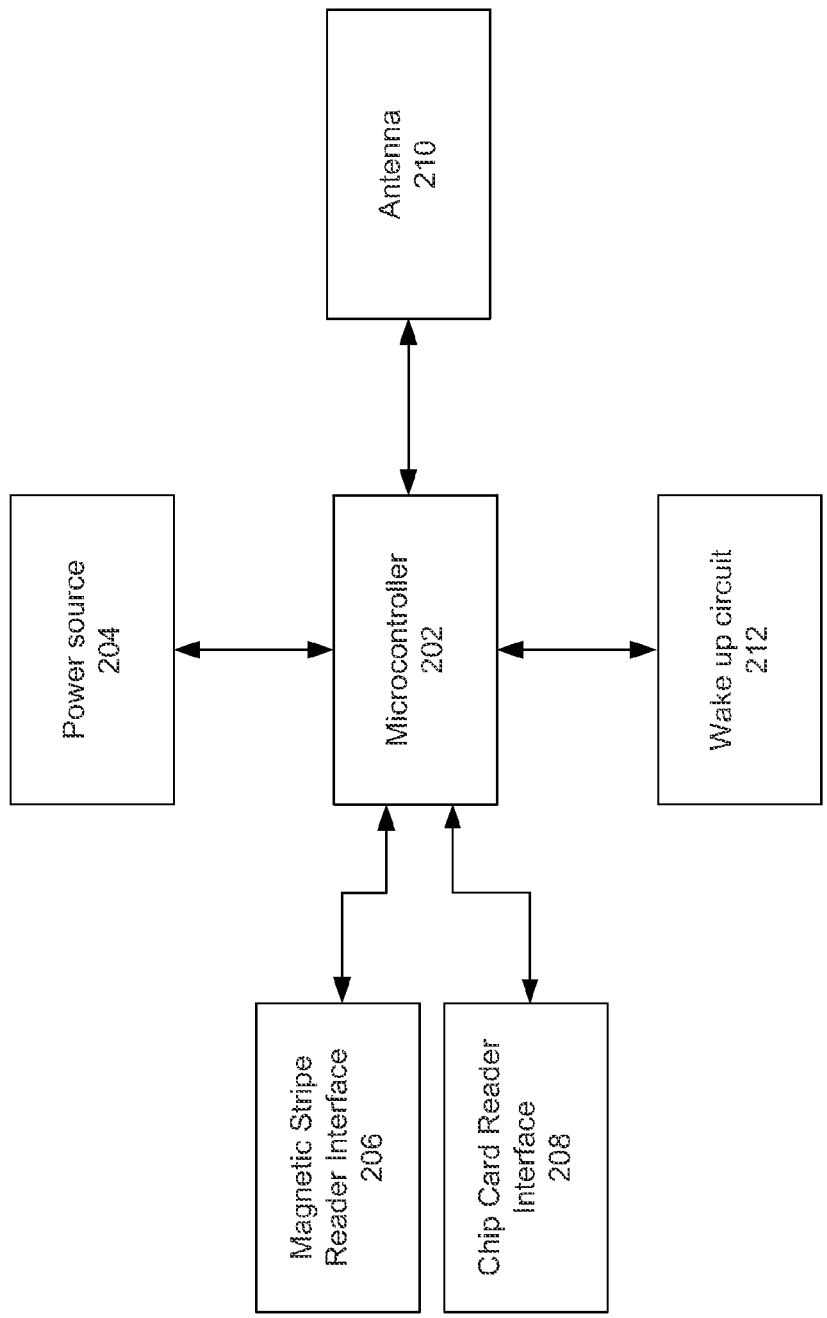
FIG. 2 is a diagram of example architecture of a wireless card reader.

FIG. 2 is a diagram of example architecture 200 of a wireless card reader. The wireless card reader includes a microcontroller 202, a power source 204, a wake up circuit 212, and an antenna 210. The wireless card reader can also include one or more card reader interfaces, e.g., a magnetic stripe reader interface 206 and a chip card reader interface 208.

The microcontroller 202 manages each component in the wireless card reader. The microcontroller 202 can power on or off any individual component, e.g., using the power source 204, and can communicate between the components, e.g., transfer data from a card reader interface 206, 208 to the antenna 210.

In some implementations, the magnetic stripe reader interface 206 and the chip card reader interface 208 are combined into one card interface that can process both types of cards.

The wake up circuit 212 can be installed into individual card interfaces or the combined card interface to trigger a wakeup of the microcontroller 202 upon a card interaction, e.g., a card swipe at or card insertion into the card interface. The wake up circuit 212 can include one or more amplifiers, capacitors for signal filtering, comparators, and sensors that detect signals from the one or more card interfaces.

In some implementations, the power source 204 is a rechargeable battery, e.g., a lithium ion battery. The power source 204 in the wireless card reader can be recharged using an external adapter or a Universal Serial Bus (USB) port. In some examples, the power source 204 can be recharged via electrical contacts in the wireless card reader. In other examples, the external adapter recharges the power source through induction. In some other examples, the external adapter provides power by engaging with unused electrical contacts of one of the card interfaces, e.g., the chip card reader interface.

In some implementations, the power source includes a direct current convertor. The direct current convertor can convert power from the power source into usable power for the microcontroller. The microcontroller can use the usable power to perform operations of the wireless card reader.

FIGS. 3A-3D are diagrams of an example power sequence for a mobile card reader that is power efficient. The mobile card reader can be powered so that each component is powered only when the component is in use. In other words, no components are running idly. In a typical payment transaction, the wake up circuit 212 is powered first, followed by the microcontroller 202, followed by one or more card reader interfaces 206, 208, and finally followed by the antenna 210.

Figure 3A:
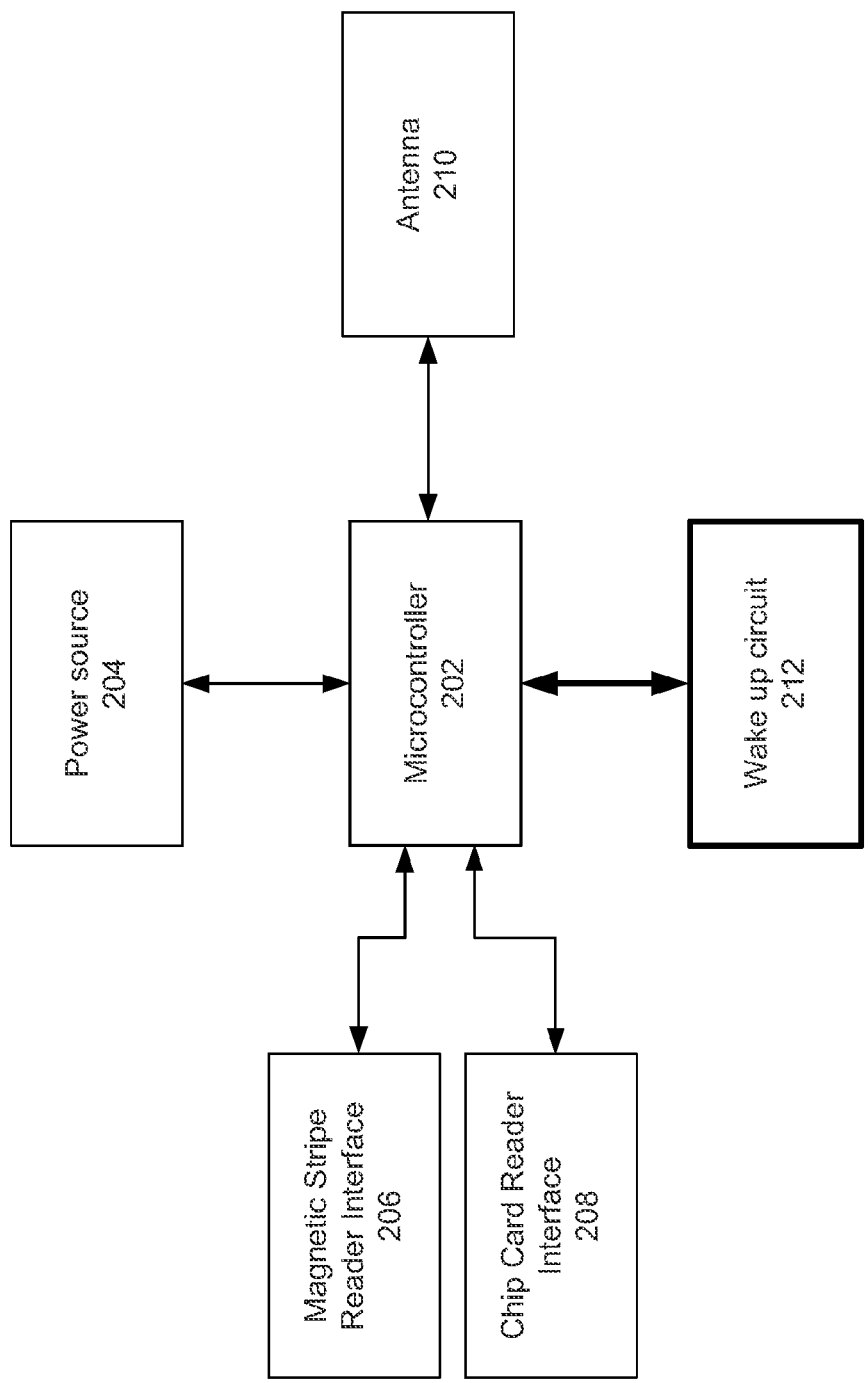
FIGS. 3A-3D are diagrams of an example power sequence for a mobile card reader that is power efficient.

FIG. 3A is a diagram of a wireless card reader with a wake up circuit 212 that is powered up, e.g., the box that is bolded, while other components in the wireless card reader are powered down, e.g., boxes that are not bolded. Prior to the wake up circuit 212 being powered up, each component is powered down. The wake up circuit 212 is configured to be triggered, e.g., powered on, upon detecting a card interaction. The card interaction can be a card swipe at a magnetic strip reader 206 interface or a card insertion at a chip card reader interface 208. In some implementations, upon receiving a card interaction from a user, the wake up circuit 212 is powered on.

In some implementations, the wake up circuit 212 notifies the microcontroller 202 of the type of card interaction that triggered the wake up circuit 212. This allows the microcontroller 202 to allocate power to the appropriate card reader interface. For example, if the card interaction is a card swipe, the wake up circuit 212 can send a "card swipe" signal to the microcontroller 202, which then powers the magnetic card stripe reader 206 but not the chip card reader 208. On the other hand, if the card interaction is a card insertion, the wake up circuit 212 can send a "card insertion" signal to the microcontroller 202, which then powers the chip card reader 208 but not the magnetic card stripe reader 206.

In some implementations, a card that is swiped or inserted into the reader physically engage distinct mechanical switches in the magnetic card stripe reader 206 and the chip card reader 208, respectively. In some examples, one or more mechanical switches are in communication with the read head, a spring in the reader, or a slot in the card reader. Swiping or inserting a card into the slot in the card reader can engage the mechanical switches. In some implementations, the swiping or the inserting generates enough voltage to activate the wake up circuit 212. Engaging the distinct mechanical switches can cause distinct signals, which indicate the type of card interaction, to be sent to the microcontroller 202. In alternative implementations, the microcontroller 202 distinguishes card interaction by determining whether data comes from read heads of the magnetic card stripe reader 206 or chip contacts of the chip card reader 208.

The microcontroller 202 can be triggered through other methods. In some implementations, the wireless card reader includes an accelerometer. Motion of the accelerometer generates a signal, which triggers a wake up of the wireless card reader. For example, if a user picks up the wireless card reader from a table, the accelerometer can send a signal to wake up the microcontroller 202. In some other implementations, a touch sensor, e.g., capacitive touch sensor, is included on a surface of the wireless card reader. The touch sensor can trigger a wake up of the microcontroller 202 upon touch detection, e.g., a user holds the wireless card reader.

Figure 3B:
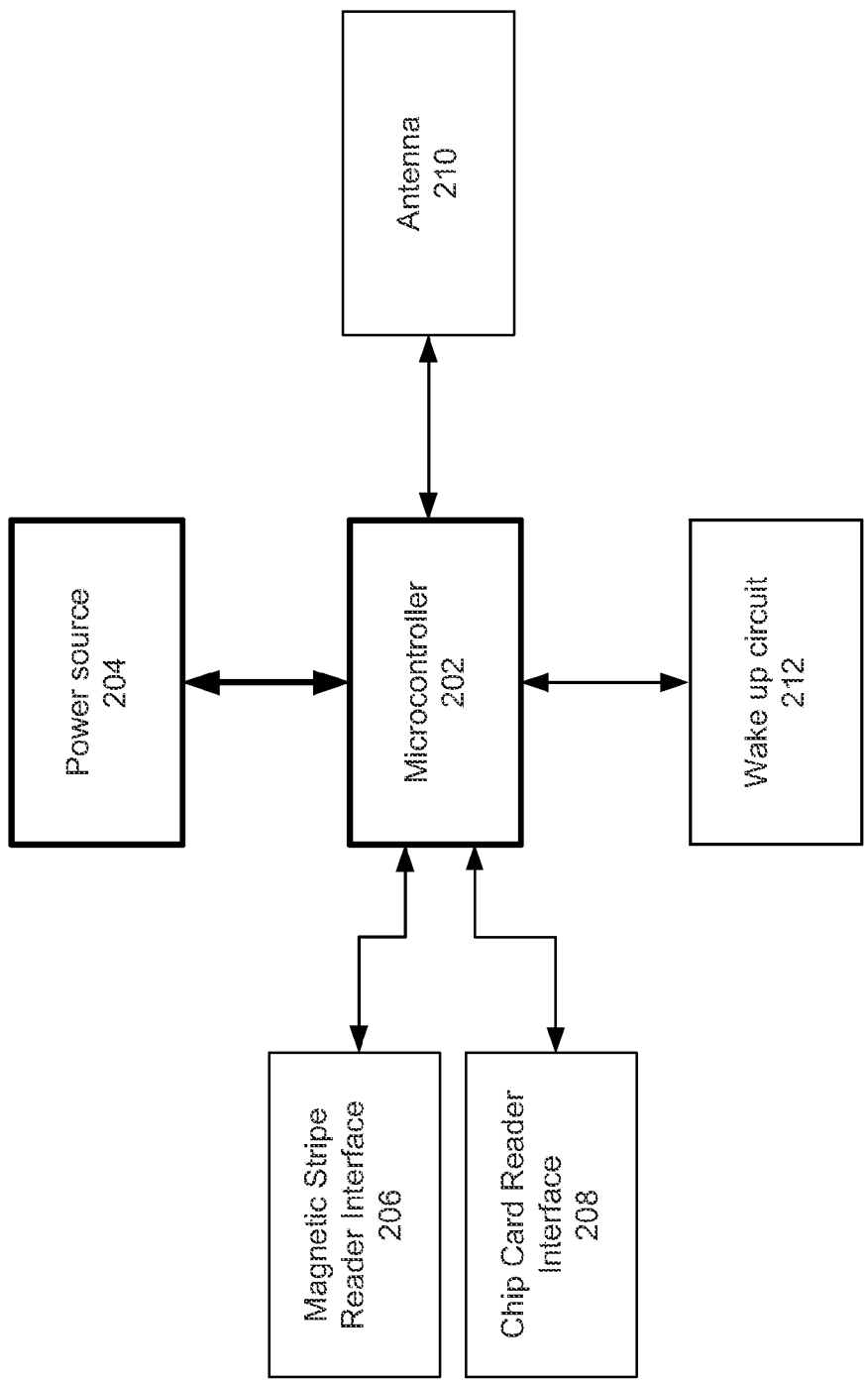

FIG. 3B is a diagram of a wireless card reader with a microcontroller 202 that is powered up by a power source 204 while other components in the wireless card reader are powered down. After an initial card interaction, the wake up circuit 212 activates the microcontroller 202 and the power source 204, which powers the components, including the microcontroller 202, in the wireless card reader.

In some implementations, once the microcontroller 202 is activated by the wake up circuit 212, the microcontroller 202 powers down the wake up circuit 212. In alternative implementations, the wake up circuit 212 automatically powers down by itself.

Figure 3C:
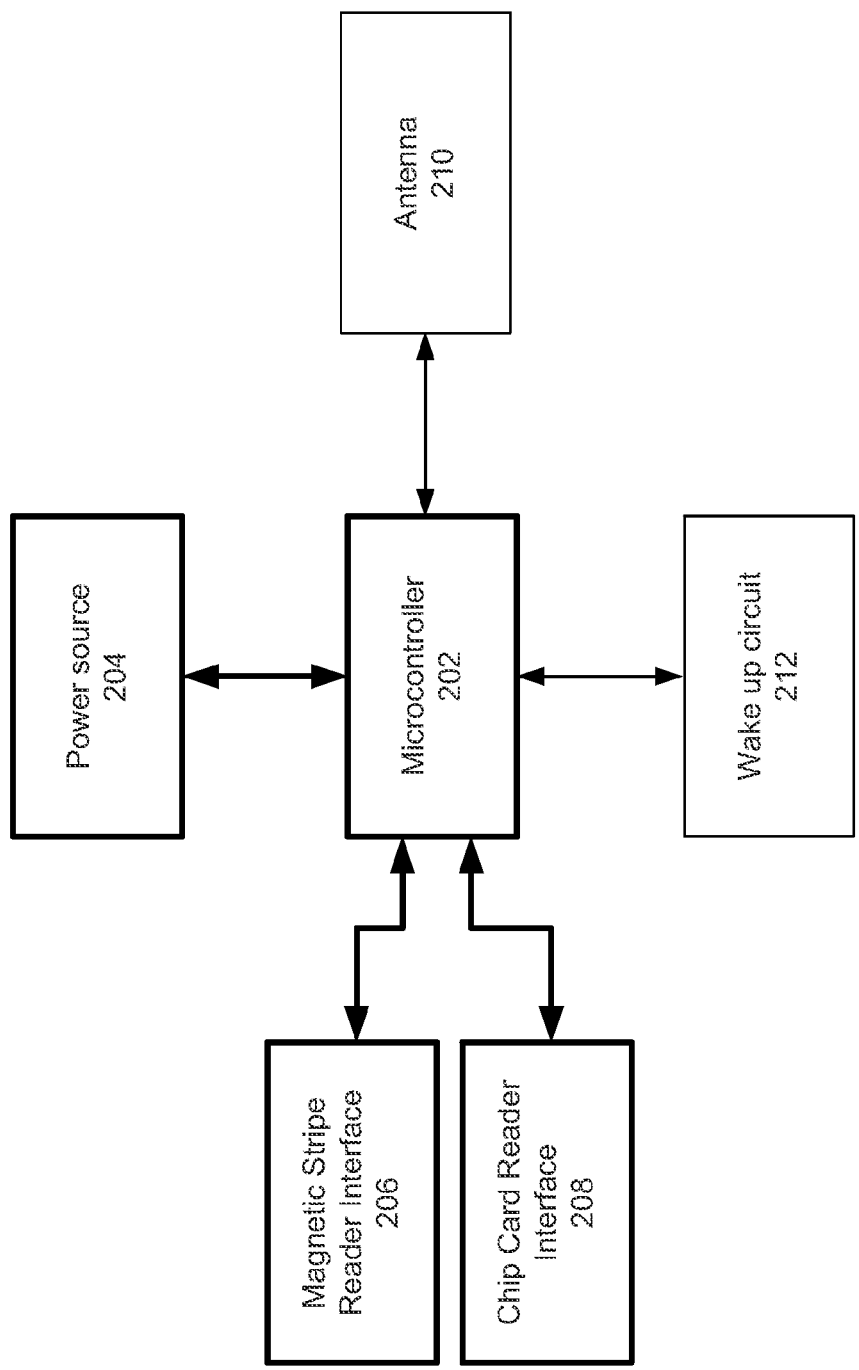

FIG. 3C is a diagram of a wireless card reader with a microcontroller 202 and card reader interfaces 206, 208 that are powered up by a power source 204 while other components in the wireless card reader are powered down. As described above, the microcontroller 202 can power up the appropriate card reader interface, and not multiple interfaces, to save power. The appropriate card reader interface can send card data to the microcontroller. The card data can include data identifying the card, e.g., a card number, or other commands, e.g., a command to receive a PIN entry from a user.

Figure 3D:
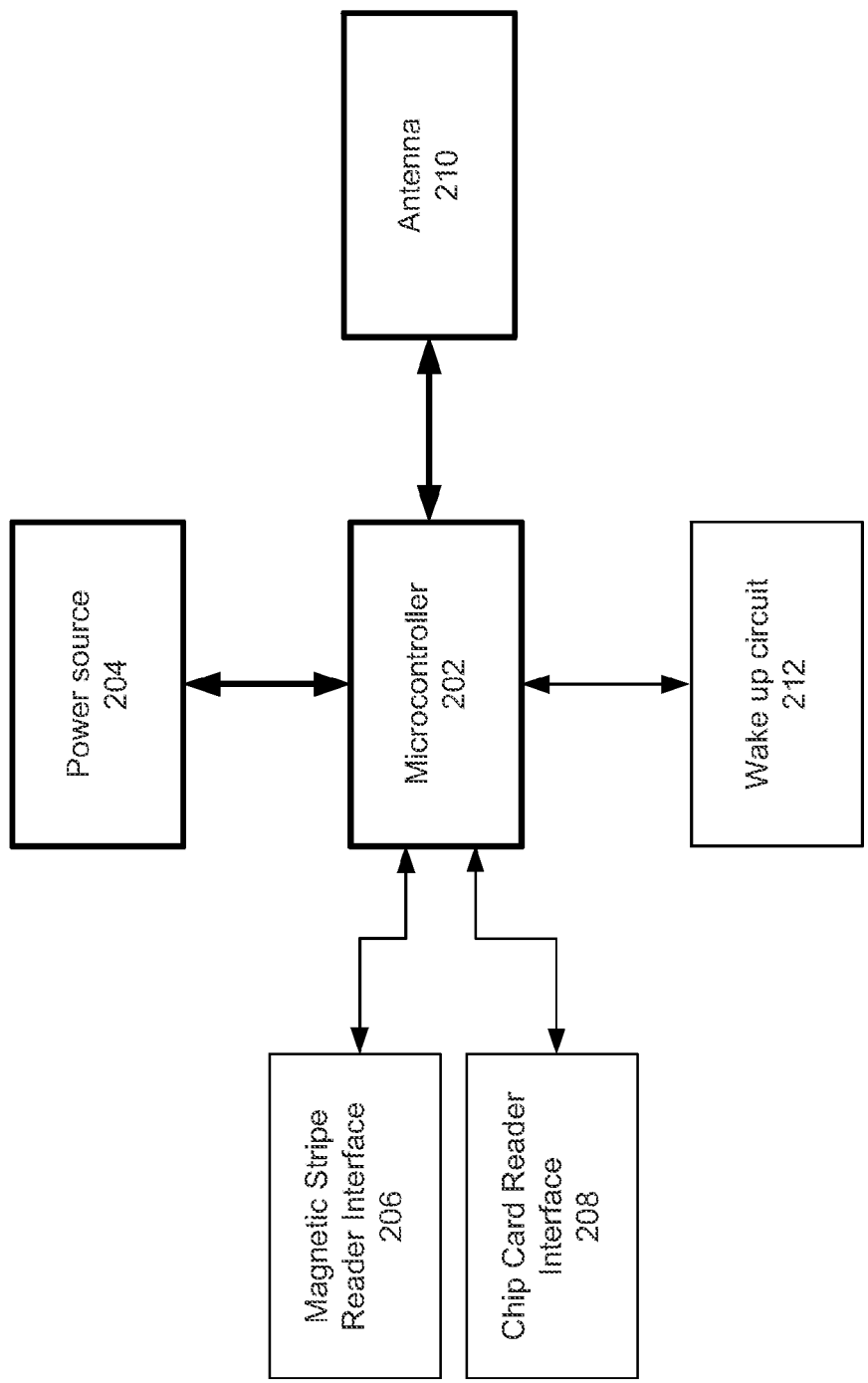

FIG. 3D is a diagram of a wireless card reader with a microcontroller 202 and an antenna 210 that are powered up by a power source 204 while other components in the wireless card reader are powered down. The microcontroller 202 receives card data from an appropriate card reader interface and can power down the appropriate card reader interface while powering up the antenna 210. In some implementations, the antenna is a Bluetooth adapter that communicates using a Bluetooth protocol, e.g., Bluetooth Low Energy (LE). In alternative implementations, the antenna is a WiFi adapter that communicates through a WiFi network. The microcontroller 202 sends the card data to the antenna 210, which sends the card data to a computing device.

In some implementations, once the card data is sent to the computing device, the microcontroller 202 powers down the antenna 210, and then powers itself down. The wireless card reader then is completely powered off and can be powered on again through the wake up circuit 212.

In some implementations, the wireless card reader may be processing a transaction following the EMV protocol, which requires more than one communication round trip between the wireless card reader and a computing device before the transaction is approved. Therefore, if the microcontroller 202 should expect a response from the computing device according to the protocol, the microcontroller 202 does not power down the antenna 210 after sending card data to the computing device. Instead, the microcontroller 202 can power the antenna 210 at a state, e.g., a low-power state, so that the antenna 210 can receive data transmission from the computing device. After receiving data from the computing device, the microcontroller 202 powers up an appropriate card interface and provides the data to the card interface, if necessary. For example, in the EMV protocol, the microcontroller 202 can receive a user-entered PIN through the antenna 210 and send the PIN to the chip card reader interface 208, which sends the PIN to a smart chip card for a PIN comparison.

When communicating between the wireless card reader and the computing device, communication can be encrypted. Encrypted communications between a mobile card reader and a computing device is described in U.S. Patent Application (Ser. No. 61/658,828), filed on Jun. 12, 2012, entitled "Software Pin Entry," which is incorporated by reference herein in its entirety. The wireless card reader can include a unique identification and/or cryptographic key, e.g., installed in read-only memory of the wireless card reader.

Figure 4A:
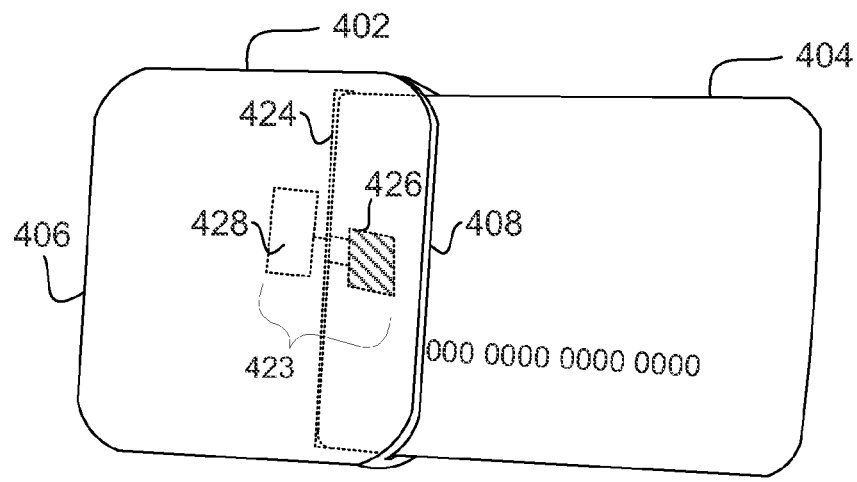
FIG. 4A is an example perspective view of a wireless card reader with a smart chip card being inserted.
Figure 4B:
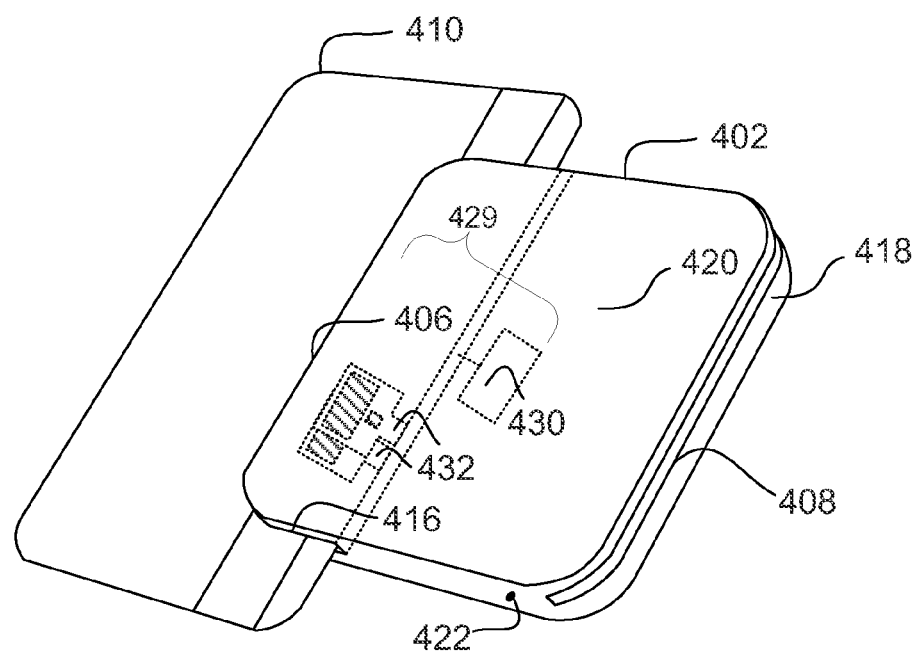
FIG. 4B is an example perspective view of a wireless card reader with a magnetic stripe card being swiped.

FIG. 4A is an example perspective view 400 of a wireless card reader 402 with a smart chip card 404 being inserted at a slot 408 of a chip card reader interface 423. FIG. 4B is an example perspective view 412 of a wireless card reader 400 with a magnetic stripe card 410 being swiped at a groove 406 of a magnetic stripe reader interface 429 that is opposite to the chip card reader interface 423.

The wireless card reader 402 can have a frame that is configured to receive card insertions or card swipes. The frame can include a top surface 420, side surfaces 418, and a bottom surface 422. In the implementations shown in FIGS. 4A and 4B, the wireless card reader 402 has a frame that is shaped as a thin parallelepiped, e.g., the width of the frame (along the top surface 410) is at least five or ten times the height (along the side surfaces 418). The top surface and bottom surface can be generally shaped as a square or rectangle, e.g., a square or rectangle with rounded edges.

The side surfaces 418 can include one or more openings that receive cards through, respectively, one or more card interfaces. The one or more card interfaces include circuitry, e.g., chip card reader circuitry 428 or magnetic stripe reader circuitry 430, configured to read data stored on the card. In some implementations, the wireless card reader has two openings on opposite sides of the frame, and a card interface within each opening.

The wireless card reader 402 can include circuitry configured to direct signals from the one or more card interfaces, to communicate wirelessly with a computing device, and to efficiently power the wireless card reader 402 as described above in reference to FIGS. 1-3. The one or more card interfaces of the wireless card reader 402 can include both a chip card reader interface 423 and a magnetic stripe reader interface 429. In some implementations, the interfaces are on opposite sides of the wireless card reader 402 as shown in FIGS. 4A-B. In particular, the card reader 402 can include both a groove 406 on one side surface of the frame and a slot 408 on an opposite side surface of the frame. The groove 406 can extend across the entire width of the frame, and can be configured to receive a swipe of a magnetic stripe card. The magnetic stripe reader interface 429, including magnetic read heads 432 positioned to read the magnetic information on the stripe of the card as it is being swiped, are positioned in the groove 406. The slot 408 can extend across part, but not all of the width of the frame, leaving one or more thin side walls 424 to constrain the lateral position of a chip card as it is inserted into the slot 408. The chip card reader interface 423, including electrical contacts 426 positioned to electrically engage the contacts on the chip card when it is inserted, are positioned in the slot 408.

In alternative implementations, the interfaces are on the same side of the wireless card reader 402 and share an opening for receiving smart chip cards and magnetic stripe cards. In some implementations, a spring-loaded gate is included within the slot 408 of a chip card reader interface 423. The spring-loaded gate can be configured to engage the electrical contacts 426 with the contacts of a chip card when a chip card is inserted. On the other hand, the spring-loaded gate keeps the electrical contacts 426 recessed so a card being swiped does not engage with the electrical contacts 426.

In some implementations, the chip card reader interface 423 is configured to receive an external adapter through the electrical contacts 426. The external adapter can provide power to recharge the wireless card reader 402, e.g., by engaging the electrical contacts 426. The external adapter can connect the chip card reader interface 423 to a USB port or power supply. The external adapter can also provide software updates to the wireless card reader 402. In some implementations, the wireless card reader 402 includes one or more light emitting diodes (LED) 422 that indicate a state (e.g., sleep, wake, transmission/receiving data, etc.) of the wireless card reader 402. The state can include whether the wireless card reader 402 is communicating with a computing device. For example, the LED 422 can display whether the wireless card reader 402 receives an acknowledgement signal or is transmitting data to a computing device. The state can also indicate whether the wireless card reader 402 is powered on. The indication can be represented through lighting effects, e.g., color, blinking, or fading of the LED.

An LED 422 can be included near one or more of the card reader interfaces, e.g., on a side 418 of the wireless card reader 402. An LED can also be included on a body portion 420 of the wireless card reader 402, e.g., at a center or a corner of the wireless card reader 402.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a non-transitory computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Thus, particular embodiments of the subject matter have been described. Other embodiments are within the scope of the following claims. For example, usage of the wireless card reader may not be limited to financial transactions but could also be applied to other environments, such as processing driver's licenses.

What is claimed is:

1. A card reader that communicates wirelessly, comprising:
   a frame, where the frame includes a first surface that defines a first plane, a second surface that is substantially parallel to the first plane, a third surface that is substantially perpendicular to the first plane, and a fourth surface that is substantially perpendicular to the first plane and is located on an opposite side of the frame from the third surface, the third surface including a groove configured to receive a swipe of a magnetic stripe card that includes card data, the fourth surface including a slot configured to receive an insertion of a chip card that includes card data;
   a wake-up circuit;
   a microcontroller housed in the frame, wherein the wake-up circuit is configured to activate the microcontroller upon a card interaction at a magnetic stripe reader interface or a chip card reader interface, and wherein, once the microcontroller is activated, the microcontroller is configured to power down the wake-up circuit;
   the magnetic stripe reader interface including magnetic read heads positioned in the groove to read the card data from a stripe of the magnetic stripe card as it is swiped through the groove, wherein the microcontroller is configured to power down the chip card reader interface while the magnetic stripe reader interface reads the card data from the stripe of the magnetic stripe card;
   the chip card reader interface including electrical contacts positioned in the slot to contact contacts of the chip card and to read the card data from the contacts when the chip card is inserted into the slot, wherein the microcontroller is configured to power down the magnetic stripe reader interface while the chip card reader interface reads the card data from the contacts of the chip;

circuitry configured to direct signals including the card data from the magnetic stripe reader interface and the chip card reader interface to the microcontroller; and circuitry configured to communicate wirelessly between the card reader and a computing device and to wirelessly send the card data from the magnetic stripe reader interface and the chip card reader interface to the computing device, wherein the microcontroller is configured to power up the circuitry for communicating wirelessly only after receipt of card data from the magnetic stripe reader interface or the chip card reader interface, and wherein, upon powering up the circuitry for communicating wirelessly, the microcontroller is configured to power down both the magnetic stripe reader interface and the chip card reader interface.

2. The reader of claim 1, where the card data includes a signature, an authentication notification for a transaction, a card number, an expiry date, or a name.

3. The reader of claim 1, where the magnetic stripe reader interface is coupled to an accelerometer, where the accelerometer triggers or functions as the wake-up circuit.

4. The reader of claim 1, where the microcontroller is configured to activate only one of the chip card reader interface or the magnetic stripe reader interface.

5. The reader of claim 1, where the card interaction is a card swipe or a card insertion.

6. The reader of claim 1, further comprising a power source, where the power source powers one or more of the following: the magnetic stripe reader interface, the chip card reader interface, the circuitry configured to direct signals, and the circuitry configured to communicate wirelessly.

7. The reader of claim 6, where the power source includes a direct current convertor, where the direct current convertor converts current from the power source to usable power for the microcontroller, and where the microcontroller is powered by the usable power.

8. The reader of claim 6, where the power source includes a lithium ion battery.

9. The reader of claim 6, where the power source includes a rechargeable battery, where the rechargeable battery is recharged using an external adapter or a Universal Serial Bus (USB).

10. The reader of claim 9, where the external adapter provides power through unused electrical contacts of the chip card reader interface.

11. The reader of claim 9, where the external adapter is a connector that engages with electrical contacts of one of the card interfaces.

12. The reader of claim 1, where the magnetic stripe reader interface and the chip card reader interface are integrated as a combined interface.

13. The reader of claim 12, where the combined interface includes a spring loaded gate, where if a card is inserted at the combined interface, electrical contacts of the spring loaded gate are engaged with the card, and where if the card is swiped at the combined interface, the electrical contacts are recessed from the card.

14. The reader of claim 1, where the chip card reader interface implements the Europay, Mastercard, Visa (EMV) protocol.

15. The reader of claim 1, where the circuitry configured to communicate wireless includes an antenna.

16. The reader of claim 15, where the antenna is a WiFi adapter and communicates through a WiFi network.

17. The reader of claim 15, where the antenna is a Bluetooth adapter and communicates using a Bluetooth protocol.

18. The reader of claim 1, further comprising a contactless card reader interface, where the microcontroller is configured to operate with the contactless card reader interface.

* * * * *